United States Patent
Selmer-Pedersen

[11] Patent Number: 5,806,694
[45] Date of Patent: Sep. 15, 1998

[54] STORAGE RACK FOR CD-CASSETTES

[76] Inventor: Karsten Selmer-Pedersen, Søborg Hovedgade 54, 3.th, DK-2860 Søborg, Denmark

[21] Appl. No.: 724,582
[22] Filed: Sep. 30, 1996

Related U.S. Application Data

[63] Continuation of PCT/DK95/00135 Mar. 28, 1995.

[30] Foreign Application Priority Data

Mar. 29, 1994 [DK] Denmark ................................. 0355/94

[51] Int. Cl.⁶ ............................. A47G 29/00; A47F 5/08
[52] U.S. Cl. ............................. 211/40; 211/96; 312/9.58; 206/308.1
[58] Field of Search ................................. 211/40, 47, 48, 211/96, 169; 312/9.46, 9.58; 206/387.1, 308.1, 309

[56] References Cited

U.S. PATENT DOCUMENTS

| | | | |
|---|---|---|---|
| 2,690,843 | 10/1954 | Ament | 211/40 |
| 3,784,269 | 1/1974 | Frenkel | 211/40 X |
| 3,812,975 | 5/1974 | Gutiernez | 211/40 |
| 3,897,871 | 8/1975 | Zinnbauer | 211/40 X |
| 4,781,292 | 11/1988 | Sacherman et al. | 206/309 |
| 5,165,555 | 11/1992 | Anatalio | 211/96 |

FOREIGN PATENT DOCUMENTS

| | | |
|---|---|---|
| 0368075 | 10/1989 | European Pat. Off. . |
| 0402822 | 12/1990 | European Pat. Off. . |
| 621050 | 3/1962 | France ..................................... 211/40 |
| 2130874 | 6/1984 | United Kingdom . |
| 2261209 | 5/1993 | United Kingdom . |

Primary Examiner—Peter M. Cuomo
Assistant Examiner—James O. Hansen
Attorney, Agent, or Firm—Jacobson, Price, Holman & Stern, PLLC

[57] ABSTRACT

A storage rack for CD-cassettes, intended for vertical mounting. The rack includes two rails, together with a number of holder members for releasably receiving a corresponding number of cassettes, and pivots for pivotally securing the holder members at two opposite ends thereof in relation to the rails. The rails include corresponding fasteners. Each holder member includes a set of two separate guide shoes. Each guide shoe includes a pivot part for the pivotally securing thereof to one of the rails and a holder part including an inner cut-out corresponding substantially to the dimensions of the corners of the actual cassettes. The guide shoes are intended for mutual co-operation by receiving one each of two opposite corners of the cassette. A resilient member is connected to at least one of the guide shoes for exerting a compressive pressure upon the cassette. A non-skid surface may be provided on the inner surface of the guide shoes. The pivot part of the guide shoes is preferably generally cylindrical.

9 Claims, 3 Drawing Sheets

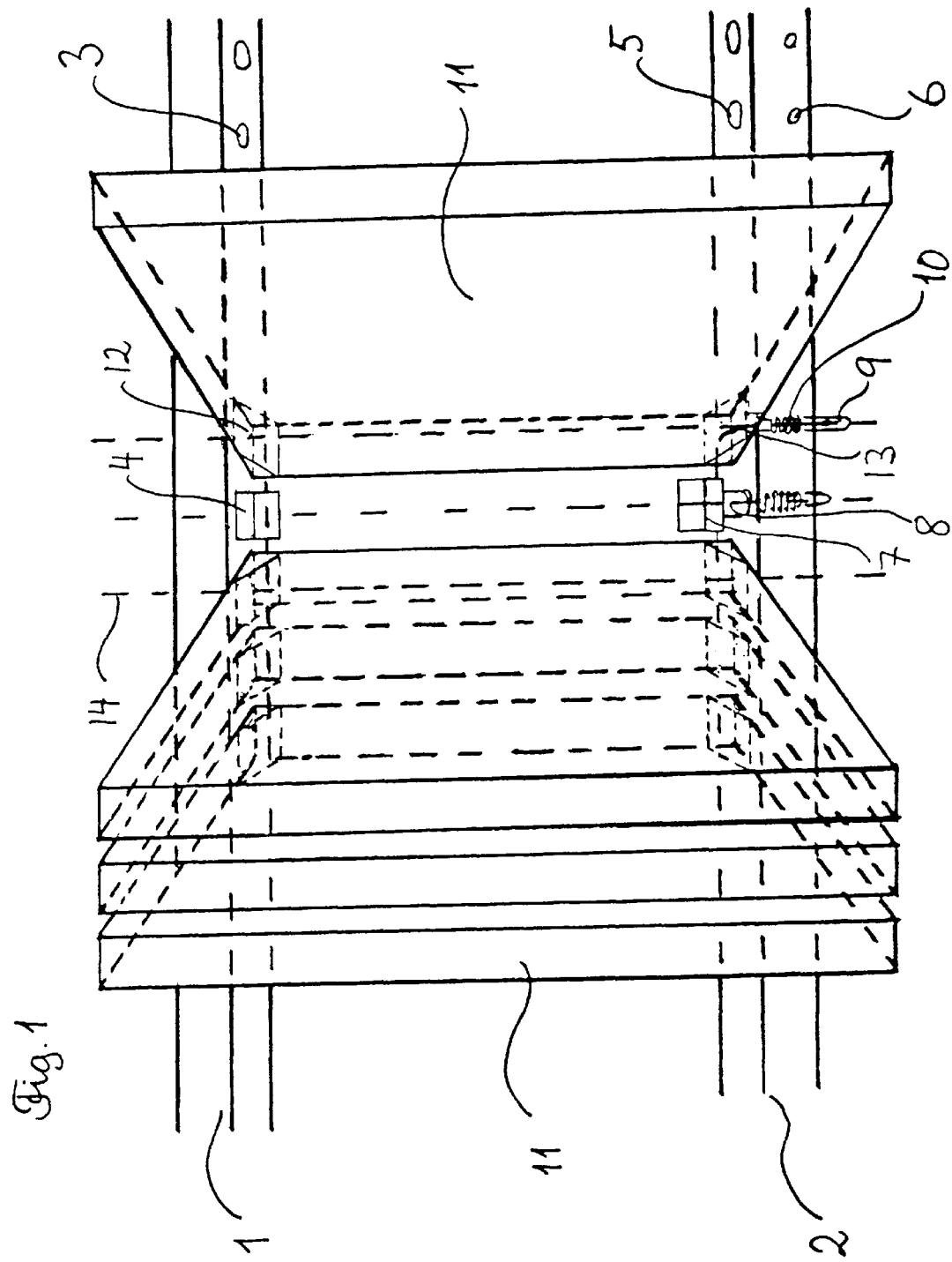

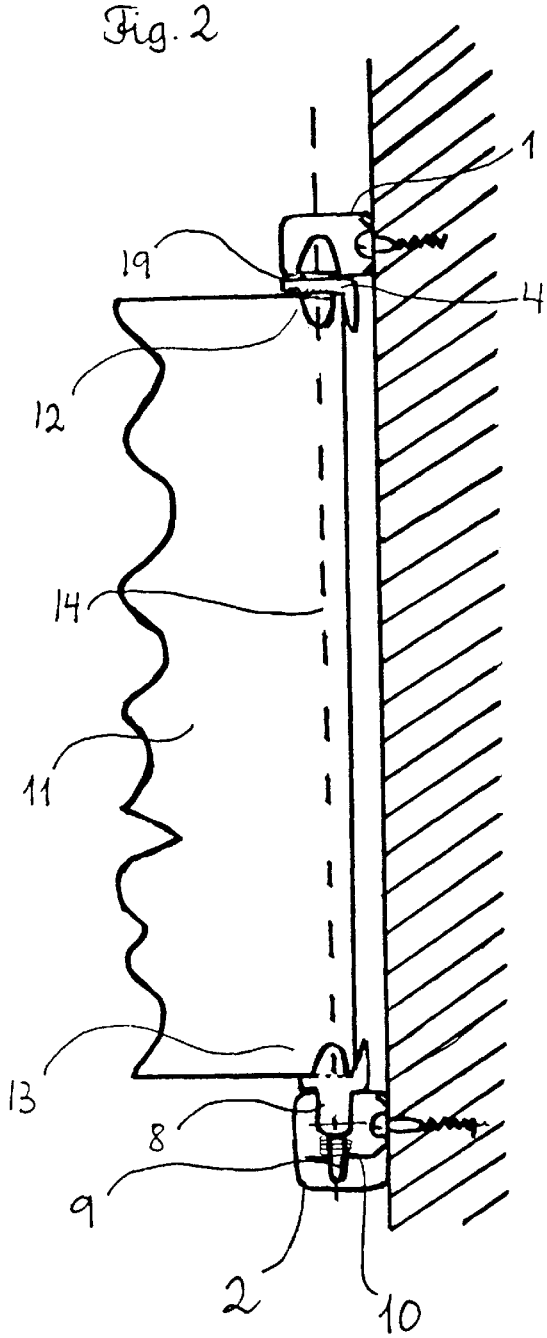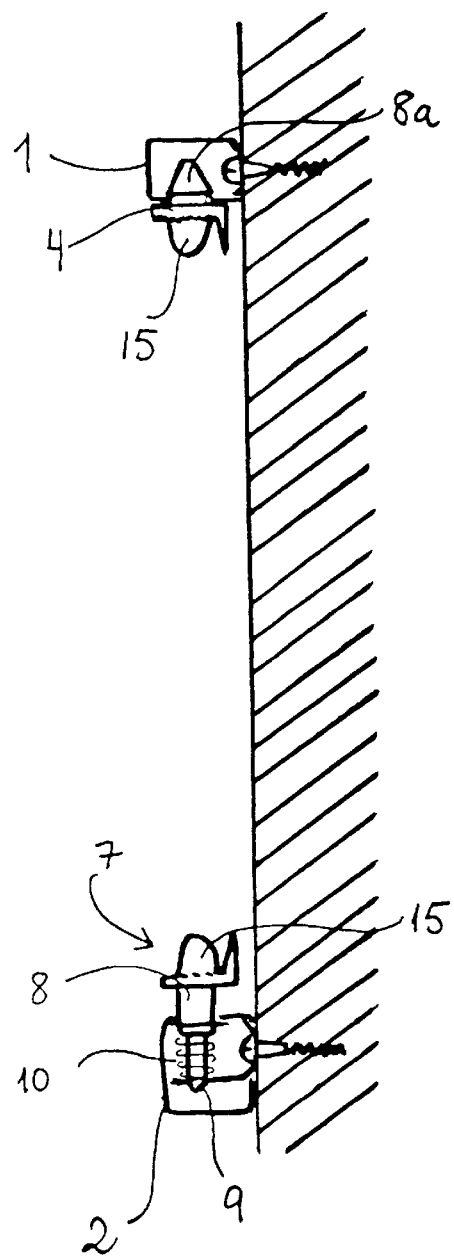

STORAGE RACK FOR CD-CASSETTES

CROSS-REFERENCES TO RELATED APPLICATIONS

This application is a application No. PCT/DK95/00135 filed on Mar. 28, 1995.

BACKGROUND OF THE INVENTION

1. Field of the Invention

The invention relates to a storage rack for CD-cassettes and the like, for instance compact disc cassettes, whether single or double, hard or floppy disks for use with a computer, video cassettes, cassettes of cassette tapes etc.

The rack of the invention is intended for vertical, or substantially vertical, mounting, viz. on a wall, in an existing bookcase system, or mounted at a separate stand to be placed for instance on a horizontal surface.

2. Description of the Prior Art

Storage racks comprising two rails for mounting on a wall or the like, together with a number of holder members for releasably receiving a corresponding number of cassettes, and pivots means for pivotally securing the holder members at two opposite ends thereof in relation to the rails, the rails comprising fastening means corresponding to the pivots of the holder members; are known from GB-A-2.130.874.

The holder members of GB-A-2.130.874 comprise a horizontal base portion and an upright portion. An extension is connected to the horizontal base portion, the length of which may be varied using a click positioning system, with a view to adapting the dimensions of this horizontal part to the actual dimension of the cassette to be inserted. Thus, the holder member is surrounding completely the cassette on two of the four end walls and a slight horizontal pressure is excerted on the cassette due to the click positioning system of the extension.

EP-A2-0 402 822 relates to an anti-theft case, viz. a single holder member in the form of a box, which surrounds an inserted cassette at all four end walls thereof. A movable abutment member intended for authorized central, mechanical or magnetic operation is connected with the holder with a view to securely locking the cassette into the box, said abutment member being inaccessible for unauthorized persons using from the outside any simple tool. In one embodiment (FIG. 8), the holder member carries studlike extensions for placing the holder in a swingable and overhanging manner between the shoulders of an exhibitor, for example of the horizontally extending type.

U.S. Pat. No. 2.690.843 discloses a storage system for such articles as phonograph records. The system is overall cylindrical and intended for placement on a table or on the floor. The system comprises two circular display units carrying bearing holes for the swingable reception of a number of record holding brackets. These holder members comprise two legs mutually connected at a right angle and surrounding the record on two of the four end walls. Diagonally extending brace members are provided on these legs with a view to improving the strength and guiding the records during their insertion in the holder member. U-shaped members are provided at the horizontal leg, but these serve solely identification purposes.

GB-A-2.261.209 relates to a CD storage system of the so-called flipper type, i.e. comprising a tray for horizontal placement on a table or the like, said tray carrying a number of pivotable holder members for the reception of CD-cassettes. The cassettes are hold in the holder members under the influence of gravity. The problem underlying this document is how to open the cassettes, especially the cassettes of double CD's, for removal and insertion of the CD, while the cassette is still placed in the holder member. The holder member consists of a base plate and two side walls defining a space for receiving one of the end walls of a CD-cassette, together with two upstanding end plates covering a part, perhaps a third or so, of another end wall of the CD-cassette each.

SUMMARY OF THE INVENTION

The problem underlying the invention is how to simplify these known CD storage systems while retaining a satisfactory secure holding of the cassettes as placed in the holders, as well as the cassettes' easy removal from and insertion in the holder members.

According to the invention, this problem is solved by each holder member comprising a set of two separate guide shoes, each guide shoe comprising a pivot part for the pivotally securing thereof to one of the rails and a holder part carrying a cut-out corresponding substantially to the dimensions of the corners of the actual cassettes, said set of two guide shoes being intended for mutual co-operation by receiving one each of two opposite corners of the cassette, a resilient member being connected to at least one of the guide shoes for excerting a compressive pressure upon the cassette.

The holder members of the prior art are rather large and completely surround at least one and a half end wall of the cassette, usually two end walls, sometimes even all four end walls. So the fact, that these known holder members can be reduced to two very small guide shoes, including appropriate resilient members, said guide shoes gripping two corners only of the cassette, is rather surprising; in all events it goes beyond the prevailing conventional teaching.

The invention also relates to a guide shoe for use in the storage rack of the invention, said guide shoe generally comprising a pivot part and a holder part carrying an inner cut-out corresponding substantially to the dimensions of one corner of a cassette.

DESCRIPTION OF THE PREFERRED EMBODIMENTS

Although it might be slightly inclined for whatever practical physical reason, the pivot axis defined by the pivot parts of two guide shoes intended for co-operation is preferably substantially vertical. However, the said pivot axis might even be substantially horizontal, since the storage rack of the invention is in principle suspendable, too, i.e. the rack having an overall extension generally perpendicular to the one as described above and as shown in the accompanying drawings.

The precise construction of the rails is highly variable. Basically, a profile of a generally L-shaped cross-section is technically fully satisfactory, since it comprises a vertical upright portion to be hung up with screws or the like on a wall, and a generally horizontal base portion for the attachment of the pivot parts of the guide shoes. Preferably, however, the rails are generally U-shaped and intended for mounting on separate mounting rails. In this embodiment, the mounting rails are mounted on a wall or the like, and the rails carrying the fastening means for the holder members are then combined with the mounting rails, using for instance a clicking or sliding positioning system.

For the rails a lot of manufacturing materials are available, such as plastic or metal. Basically, what is required is, that the material is able to withstand the load corresponding to the stored cassettes. Amongst the typical useful materials are: aluminium or aluminium alloys and stainless steel. Fully satisfactory materials are for instance stainless steel 304 or AlMgSi 0,5. For any internal separate mounting rail, an inferior quality of iron 1203 is satisfactory. The rails are appropriately formed using usual cutting and bending machines.

Similarly, a lot of manufacturing materials are available for the guide shoes. They are injection moulded using a hard plastic. The preferred plastic is of the Noryl type, model PPO (phenylene oxide resin, preferably glass fiber reinforced to avoid shrinkage); supplier: Tuesen & Funk, Lyngby, Denmark.

No restrictions as to the number of holder members or the size of the cassettes is imposed on the storage rack of the invention. But basically, each type of cassette needs its own storage rack. The typical number of holder members corresponds to the storage of 30 single CD cassettes.

By combining the racks of the invention in a modular system, up to 300 single CD cassettes may be accomodated on less than about 1 m$^2$. When not in use, the rack of the invention is very neutral, i.e. hardly visible and in a way merging into the wall.

The pivot part of the guide shoe may vary, for instance it could be generally cylindrical, spherical or conical. All what matters is its ease of pivotation in relation to the rail.

Concerning the holder part of the guide shoe, the important thing is, that it comprises an inner cut-out, which corresponds closely to the dimensions of the actual cassette. In the case of single CD cassettes, a cut-out in the guide shoe of the approximate dimensions 10–11×10–12×5–7 mm (width x depth x height) is fully satisfactory, the wall thickness for economical and aesthetical reasons generally being as small as possible, but of course ensuring sufficient strength. A small play is required. The outer contour of the guide shoe is highly variable. Typical examples are apparent from the accompanying drawings.

The resilient member connected to at least one of the guide shoes has shown up to be necessary in order to securely hold the cassettes in place. Any type of resilient member may be used, for instance a compression spring connected with the upper and/or lower guide shoe and excerting a vertical pressure on the cassette. A similar effect is obtainable placing e.g. a suitable elastic material such as rubber in the cut-out of the guide shoes or in the bottom of the rails. However, a brace-like element of the leaf spring type excerting a generally horizontal pressure may be used, too, as well as any desired combination thereof.

A fully satisfactory compression spring is made of standard thread DIN 17223, class C, 0,5 mm; pressure under load corresponding to 400 g.

The dependent sub-claims relate to preferred embodiments of the rack and of the guide shoes of the invention, some of which are described in further detail below:

Although not strictly necessary, the provision of a friction enhancing or non-skid element or coating of at least one of the inner surfaces of the cut-out of at least one of the guide shoes further improves the secure holding of the cassettes between the guide shoes, with a considerably lowered risk of the cassettes dropping out, when one is searching for the desired cassette by flipping back and forth over the rack. Any such friction enhancing material may be used, for instance different types of plastic or particulate material, which may be sprayed onto he surface in a regular or irregular pattern. Or the actual surface may be provided with any appropriate roughening surface profile. Preferably a thin sheet (approximate thickness 0,80 mm) of the elastomer Bumpon (supplier: 3M) is glued onto corresponding recesses formed at the inner bottom face of the cut-out of the lower guide shoe and additionally to the upper top face of the cut-out of the upper guide shoe.

In a first preferred embodiment, the pivot part of the upper guide shoe is a generally conical stud or studlike extension comprising a recess for press fit into corresponding holes cut out in the rail.

In a second preferred embodiment, the pivot part of both of the guide shoes is generally cylindrical. The means for the insertion and the attachment thereof in holes of the rail is preferably a radially extending stud, the drilled-out or punched-out holes of the rail being provided with a corresponding slit.

Preferably, the pivot part of the lower guide shoe comprises an upper cylindrical part and a lower cylindrical part of a smaller radius, the radially extending stud being provided at the upper cylindrical part, the lower rail carrying an upper set of holes, the radius of which corresponds to the radius of the upper part of the guide shoe, and a slit being connected to each upper hole corresponding to the radial extension on the guide shoe, and a lower set of holes, the radius of which corresponds to the radius of the lower cylindrical part of the guide shoe; a compression spring being supported on this lower cylindrical part thereof, said spring having a radius between the radii of the lower and the upper set of holes in the rail, respectively.

BRIEF DESCRIPTION OF THE DRAWING

Below, some preferred embodiments of the invention is described in greater detail, reference being had to the accompanying drawings, in which FIG. 1 is a perspective view of a preferred embodiment of the storage rack of the invention;

FIG. 2 is a cross-sectional side view of another preferred embodiment showing in greater detail the insertion of a cassette between a set of guide shoes;

FIG. 3 is a corresponding to FIG. 2, the cassette being removed;

Figure 4:
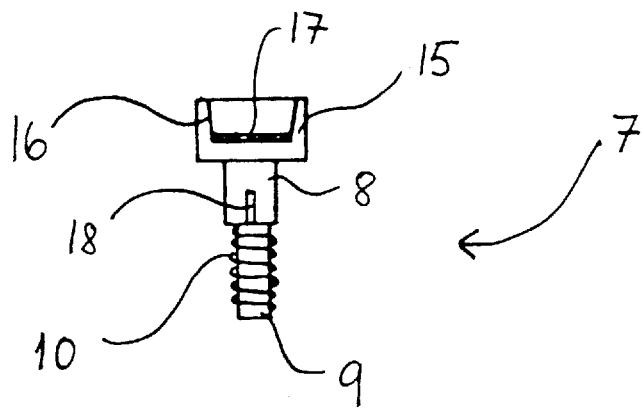
FIG. 4 is a front view of a preferred embodiment of the lower guide shoe.

The storage rack of FIG. 1 comprises two generally U-shaped rails, viz. an upper rail 1 and a lower rail 2. These rails are intended for hanging up on a wall, the means therefore, however, being not shown on this figure. The upper rail is provided with a number of holes 3 for the pivotal attachment of a number of upper guide shoes 4. The lower rail is provided with two sets of holes, viz. upper holes 5 of a first radius and lower holes 6 of a second smaller radius for the pivotal attachment of a number of lower guide shoes 7. Each set of three holes 3, 5 and 6, intended for co-operation in receiving a cassette, has a common vertical axis 14. Four cassettes 11 are shown, the possibility of flipping in the rack being illustrated, too. Two vertically opposite comers 12 and 13 of the cassette are shown inserted between the upper and lower guide shoe (4 and 7, respectively). In a side view, the holder part of the guide shoes has the outer shape of a rectangular triangle. The pivot part of the lower guide shoe is cylindrical, comprising an upper cylindrical part 8 and a lower cylindrical part 9. The radius of the lower cylindrical part corresponds to the radius of the lower holes 6, and the radius of the upper cylindrical part corresponds to the radius of the upper holes 5. A compression spring 10 is shown placed on the lower cylindrical part.

For insertion of a cassette in the rack, the lower corner 13 of the cassette 11 is fitted into the lower guide shoe 7 and a slight downward pressure is excerted against the action of the spring 10, whereby the spring is compressed. Then the upper corner 12 of the cassette 11 is fitted into the upper guide shoe 4, and the cassette is released, the force of the spring ensuring its secure holding between the guide shoes. For picking out a cassette, the procedure is reversed.

If desired, the rail may be provided with an extension to cover the tips of the lower cylindrical part, which protrude downwardly.

In the embodiment of FIGS. 2 and 3, the pivot part of the upper guide shoe 4 is generally conical, and a recess or restriction 19 is provided, enabling the press-fit of the guide shoe into the holes 3 in the upper rail 11. In this embodiment, the generally U-shaped rails 1, 2 are shown mounted on mounting rails, which are screwed directly onto the wall. The holder part 15 of the guide shoes, in this embodiment, has a somewhat more fancy overall outer contour.

Figure 5:
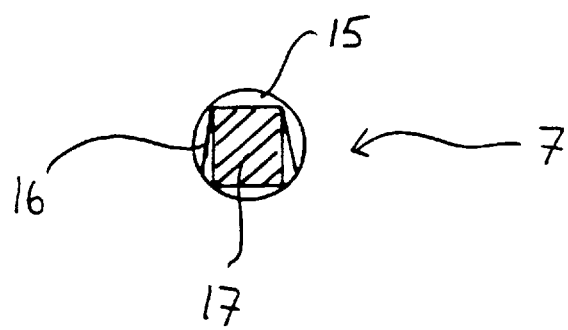
FIG. 5 is a view from above corresponding to FIG. 4.

FIGS. 4 and 5 show a variant of the lower guide shoe 7 of FIG. 1–3, in which the cut-out of the holder part has slightly conically tapering side walls 16, as well in the downward direction (FIG. 4) as in the inward direction (FIG. 5), with a view to improving the secure holding of, in this case, single CD cassettes and for the easiness of their insertion. Besides, a non-skid coating 17 is shown.

Figure 6:
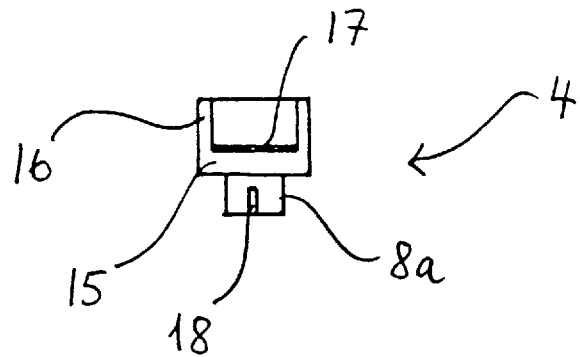
FIG. 6 a front view of a preferred embodiment of the upper guide shoe.

FIG. 6 shows a corresponding upper guide shoe. This guide shoe is to be mounted "bottom up" in the upper rail 1. The side walls 16 of the cut-out are not conically tapering. A non-skid coating 17 is shown.

In FIGS. 4, 5 and 6 a radial extending stud 18 is shown on the cylindrical part of the guide shoes 7 and 4. This stud, which might be greatly varied in shape and circumferential as well as radial extension, is to be used only during the assembly of the rack, viz. when engaging and disengaging the guide shoe in relation to the rail. The smaller this stud-like extension, the better, with a view to not having the guide shoe dropping out of engagement with the rail, when flipping over the rack.

I claim:

1. A storage rack for CD-cassettes, intended for mounting on a vertical surface, said rack comprising
    two rails, together with a number of sets of upper and lower holder members for releasably receiving a corresponding number of cassettes, and pivots means for pivotally securing each set of the holder members at two opposite ends thereof in relation to the rails, the rails including corresponding fastening means, each holder member including a guide shoe, each guide shoe including a pivot part for the pivotally securing thereof to a respective one of the rails and a holder part carrying a cut-out for corresponding substantially to the dimensions of the corners of the cassettes, said guide shoes being intended for mutual cooperation by receiving one each of two opposite corners of the cassette, and a resilient member being connected to at least one of the guide shoes for exerting a compressive pressure upon the cassette.

2. A storage rack according to claim 1, wherein at least one of inner surfaces of the cut-out of at least one of the guide shoes is a non-skid surface.

3. A storage rack according to claim 2, wherein a non-skid coating is provided at a bottom surface of the cut-out of the lower guide shoe and/or at a top surface of the cut-out of the upper guide shoe.

4. A storage rack according to claim 1, wherein the pivot part of the upper guide shoe comprises a generally conical stud having a recess for press fit into corresponding holes cut out in an upper rail.

5. A storage rack according to claim 1, wherein the pivot part of the upper guide shoe comprises a generally cylindrical part carrying a radially extending stud for releasably retaining the guide shoe in engagement with the rail, the rail carrying corresponding holes with a slit.

6. A storage rack according to claim 1, wherein the pivot part of the lower guide shoe comprises an upper cylindrical part and a lower cylindrical part of a smaller radial extension and on the upper part a radially extending stud for releasably retaining the pivot in engagement with a lower rail, the lower rail carrying an upper set of holes, a radius of which corresponds to the radius of the upper cylindrical part of the guide shoe, a slit being connected to each upper hole corresponding to the radial extension on the guide shoe, and a lower set of holes, the radius of which corresponds to the radius of a lower part of the guide shoe.

7. A storage rack according to claim 6, wherein a compression spring is supported on a lower cylindrical part of the lower guide shoe, said spring having a radius between the radii of a lower and an upper set of holes in the rail, respectively.

8. A storage rack for CD-cassettes, intended for mounting on a vertical surface, said rack comprising
    two rails, together with a number of holder members for releasably receiving a corresponding number of cassettes, and pivots means for pivotally securing the holder members at two opposite ends thereof in relation to the rails, the rails comprising corresponding fastening means, each holder member comprises a set of two separate guide shoes, each guide shoe comprising a pivot part for the pivotally securing thereof to one of the rails and a holder part carrying a cut-out for corresponding substantially to the dimensions of the corners of the cassettes, said guide shoes being intended for mutual co-operation by receiving one each of two opposite corners of the cassette, a resilient member being connected to at least one of the guide shoes for exerting a compressive pressure upon the cassette, the pivot part of the lower guide shoe including an upper cylindrical part and a lower cylindrical part of a smaller radial extension and on the upper part a radially extending stud for releasably retaining the pivot in engagement with a lower rail, the lower rail carrying an upper set of holes, a radius of which corresponds to the radius of the upper cylindrical part of the guide shoe, a slit being connected to each upper hole corresponding to the radial extension on the guide shoe, and a lower set of holes, the radius of which corresponds to the radius of a lower part of the guide shoe.

9. A storage rack according to claim 8, wherein a compression spring is supported on a lower cylindrical part of the lower guide shoe, said spring having a radius between the radii of a lower and an upper set of holes in the rail, respectively.

* * * * *